I. HARRISON.
POTATO DIGGER.
APPLICATION FILED JAN. 8, 1912.
1,135,180.
Patented Apr. 13, 1915.
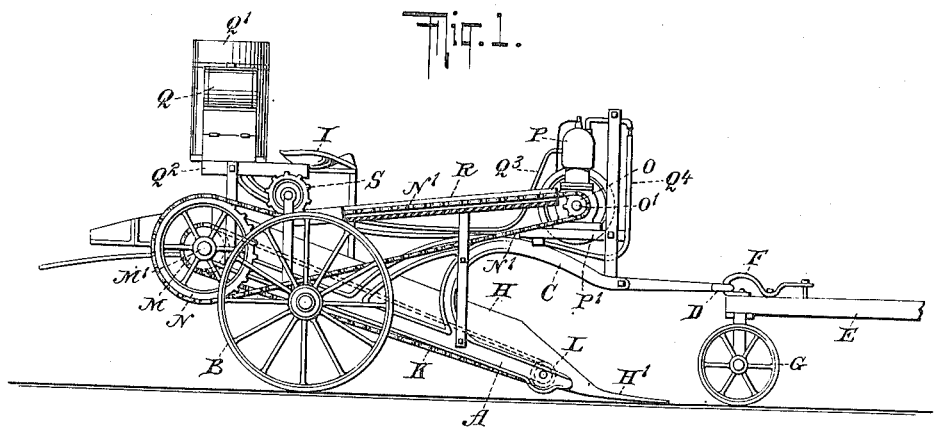
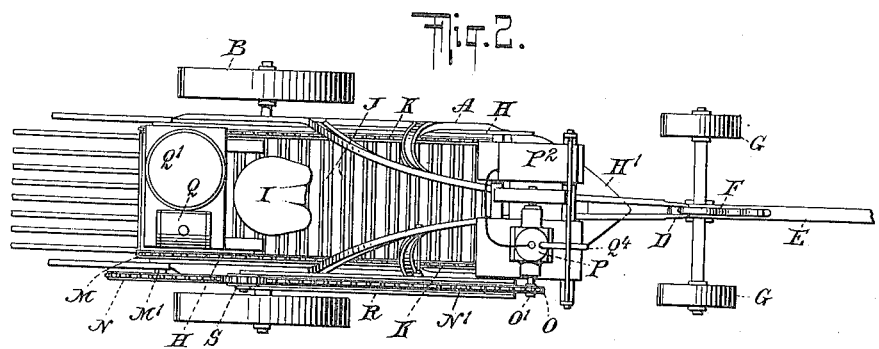
WITNESSES
INVENTOR
Isaac Harrison
BY
ATTORNEYS

UNITED STATES PATENT OFFICE.

ISAAC HARRISON, OF CREAM RIDGE, NEW JERSEY.

POTATO-DIGGER.

1,135,189.

Specification of Letters Patent.  Patented Apr. 13, 1915.

Application filed January 3, 1912.  Serial No. 669,091.

*To all whom it may concern:*

Be it known that I, ISAAC HARRISON, a citizen of the United States, and a resident of Cream Ridge, Monmouth county, State of New Jersey, have invented certain new and useful Improvements in Potato-Diggers, of which the following is a specification.

My invention relates to potato diggers and has for its object to provide a machine of this kind in which an independent actuating means is provided for the various active and movable elements of the digger, said independent actuating means being entirely separate from and independent of the motive power for propelling the digger.

My invention will be fully described hereinafter and the features of novelty will be pointed out in the appended claim.

Reference is to be had to the accompanying drawings in which—

Figure 1 is a side elevation of my improved digger and Fig. 2 is a plan view thereof.

The digger comprises the usual main frame A supported on the rear wheels B and having the usual forwardly extending beam C forming a part thereof. This beam C is provided at its front free end with an eyelet D to which the one end of the pole E is connected by means of an eyelet F. The said pole E is supported on wheels G which form the front wheels of the digger and may further be provided with the usual means through the medium of which horses or other draft animals may be hitched to the digger to propel the same. The usual auxiliary frame H carrying the customary plow share H' at its forward end is mounted on the frame A so as to be movable thereon in a manner to raise and lower said plow share, any well known operating mechanism being provided for effecting this operation. The usual driver's seat I is also provided at the customary place. An elevator or separator of any well known construction, comprising for instance spaced bars J connected and carried by oppositely arranged sprocket chains K is adapted to travel over sprocket wheels L journaled on the frame H in close proximity to the plow share H' and similar sprocket wheels M carried by a shaft M' journaled on the frame H at the upper or rear portion thereof. A third sprocket wheel N is connected to the shaft M' and is connected by means of a sprocket chain N' with a sprocket wheel O secured to the driving shaft O' of an engine P, which in the present instance is shown as of the gasolene or other explosive type. This engine P is preferably mounted on a platform P' of any suitable description secured to the main frame A at the front thereof, at a point approximately over the plow share H' which platform in the case of an explosive engine also carries the batteries or magneto $P^2$ for producing the spark in the combustion chamber of the engine. A fuel tank Q and a tank Q' for water or other cooling medium are mounted on a platform $Q^2$ located on the main frame A at a point to the rear of the rear axle and are properly connected with the engine by means of tubes or pipes $Q^3$ and $Q^4$ respectively. In order to protect the driver or operator of the digger against interference with the sprocket chain N' the upper run thereof travels lengthwise of a protecting trough R suitably secured in position on the main frame A, said chain N' being maintained at the required tension by means of a tension device comprising in the present case a sprocket S adjustably mounted on said main frame A as clearly shown in Fig. 1. It is, of course, to be understood that the usual operating levers for starting and stopping the engine are provided and further that clutches and operating devices are provided for coupling and uncoupling the sprocket N to and from the shaft M' if desired. The usual shaker at the rear of the machine may also be incorporated in the usual manner.

It will be seen that in my improved construction the motive power for propelling the digger in no way contributes to the actuation of the elevator or separator which is consequently capable of being independently operated at any desired speed regardless of the speed at which the digger is being propelled. In machines of this kind in which the elevator or separator is in driving connection with the supporting wheels of the digger the speed of operation of said elevator or separator always bears a certain single fixed ratio to the speed at which the digger is being propelled. With the present construction the speed of the elevator or separator and the speed at which the digger is traveling have no bearing on each other and any and innumerable ratios may be attained. The advantages of such a construction are many and obvious. For instance, I have found that the potatoes are raised from the ground much more easily if the digger travels slowly while a better separation of the potatoes and dirt is secured if the separator travels more rapidly. This rapid separation of potatoes and dirt also avoids a heavy accumulation of dirt and weeds on the machine and consequent straining of the structure is obviated. By disconnecting the said separator from the wheels of the digger and driving it independently, the draft of the machine is lightened so that only two horses or other draft animals are necessary with my improved machine to do the same work formerly accomplished only with the aid of four horses or other draft animals. With only two animals drawing the machine it is handled easier in the field and fewer potatoes are trodden upon and ruined than when four or more animals are necessary.

As no power to drive the separator is derived from the traction of the vehicle, the usual lugs which have heretofore been necessary on the wheels of machines of this kind may be omitted and the serious jolting when traveling over hard ground, a very serious and objectionable feature in diggers heretofore, is completely avoided. The slight vibration transmitted from the engine through the frame also promotes the sliding of the dirt over the plow share so that the machine is propelled forwardly with a minimum of power. Actual experience has proven that with the present machine and two horses ten per cent more ground can be covered in a given time than with four horses and a machine in which the separator is in driving connection with the wheels of the digger.

By mounting the cooling and fuel tanks on the machine back of rear axle, the weight thereof will assist in balancing the weight of the engine and so expedite the raising of the plow share out of the ground when necessary. With the engine mounted as shown, or in other words, at the front of the digger at a point approximately over the plowshare, the weight of said engine will aid in forcing the said plow-share into the ground and will at the same time maintain the front wheel upon the ground to obtain guidance of the vehicle. This is extremely important when the ground is hard, and serves to prevent the plow-share from simply gliding over the ground and also prevents backward tilting of the digger. The engine in the position shown and described is also always in the driver's direct line of vision when guiding the draft animals and is easily accessible to said driver. The liability of interference with said engine is reduced, while the danger of injury to the driver from explosions or other causes is also minimized.

Various changes in the specific construction and arrangement shown and described may be made within the scope of the claim without departing from the spirit of my invention.

I claim:

In a traveling potato digger the combination of a frame, rear wheels for supporting said frame, a plow share carried by said frame, a driving engine mounted on said frame in front of said wheels and approximately over said plow share, said engine being arranged to drive the potato digger mechanism independently of the draft means and to hold down the plow share, a fuel tank and a cooling agent tank connected with said engine and located on said frame to the rear of said wheels.

In witness whereof I have hereunto set my hand in the presence of two subscribing witnesses.

ISAAC HARRISON.

Witnesses:
E. E. HUTCHINSON,
M. N. BUCKALEN.